June 15, 1937. J. H. ARTHUR ET AL 2,083,589
METHOD OF MAKING ATTACHING MEMBERS
Filed Oct. 5, 1936
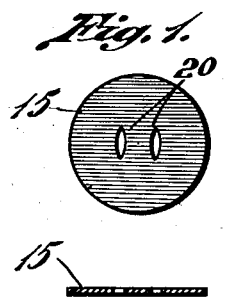 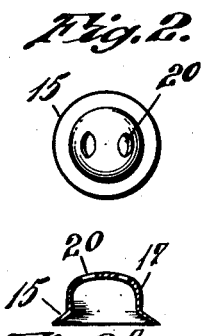 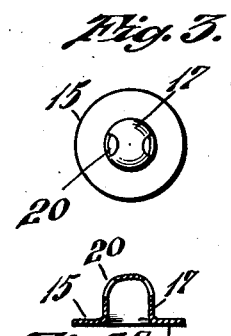 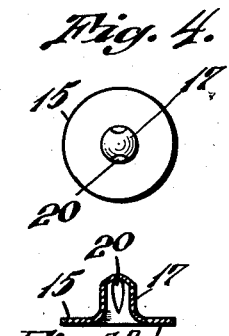
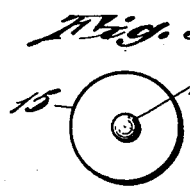  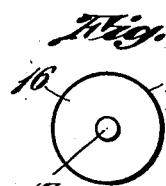 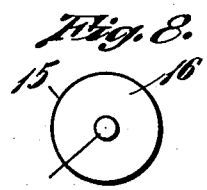
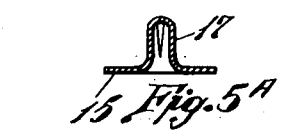   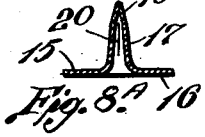
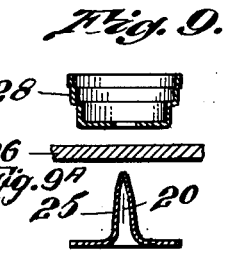 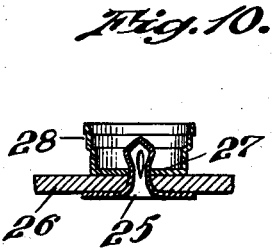 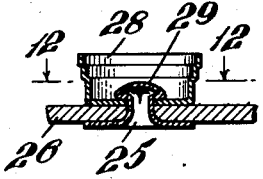
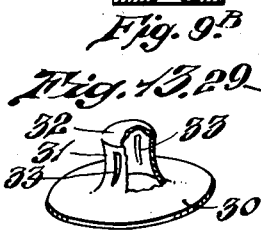 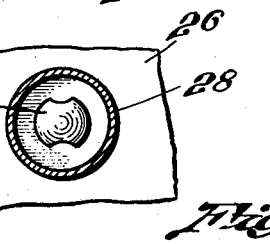 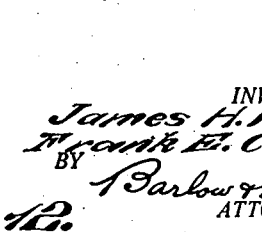
INVENTORS.
James H. Arthur
Frank E. Chace
BY Barlow & Barlow
ATTORNEYS.

Patented June 15, 1937

2,083,589

UNITED STATES PATENT OFFICE 2,083,589

METHOD OF MAKING ATTACHING MEMBERS

James H. Arthur, Providence, and Frank E. Chace, Pawtucket, R. I., assignors to Rau Fastener Company, a corporation of Rhode Island Application October 5, 1936, Serial No. 103,996

11 Claims. (Cl. 10—27)

This invention relates to improvements in attaching members for use in affixing snap fastener devices, buttons and the like to various articles; and has for one of its objects the provision of an improved rivet or tack which is particularly constructed so as to spread evenly in all directions when the inserted end is upset so as to form a head.

Another object of the invention is to provide an improved method of making a sheet metal tack or rivet from a blank consisting of a single piece of sheet metal and fashioned with a head and a hollow shank portion integral therewith having symmetrically disposed slits which serve to give the even mushroom effect.

With these and other objects in view, the invention consists of certain novel features of construction, as will be more fully described, and particularly pointed out in the appended claims.

In the accompanying drawing:

Figs. 1 to 8A inclusive are diagrammatic views, in plan and cross section, illustrative of the various and successive steps involved in carrying out one method of forming an attaching member in accordance with the present invention;

Figs. 9, 9A, 9B, 10 and 11 are diagrammatic cross sectional views representing certain operational steps in the process of installing a snap fastener on a carrying medium by an attaching member made in accordance with the present invention;

Fig. 12 is a fragmentary plan view, partly in section, taken on the line 12—12 of Fig. 11, showing a completely installed snap fastener which is firmly secured in position by an attaching member made in accordance with the present invention; and Fig. 13 is a fragmentary perspective view of a modified form of attaching member embodying this invention.

In the manufacture of attaching members of this class, one method as heretofore carried out for making such elements, particularly rivets or tacks having a head and a hollow sharp-pointed shank portion, has consisted in pressing a hollow blunt closed end shank from a single piece of sheet metal in which the head portion is integrally formed with the base of the shank. A portion of the blunt end of the shank is then cut away to form an aperture therein which is thereafter closed by pressing the shank between dies to form a sharp point.

However, it is found in many instances, that such rivets have not provided a successfully firm grip on the fastening member but are capable of being pulled loose under ordinary strains exerted upon the fastener installations, due to the fact that the end of the apertured shank when upset by the riveting operation is spread askew against the portion of the fastener member surrounding the aperture through which the shank of the tack projects and thus does not mushroom evenly in all directions while being headed.

In accordance with this invention, an attaching member in the form of a rivet or tack having a head and an elongated hollow, closed ended shank integral therewith and constructed for use in securing a snap fastener, buttons and the like to various articles may be made from a single piece of sheet metal in which the improved process comprises the steps of providing a piece of sheet metal of suitable shape and sufficient extent of surface to form a blank from which can be made in one piece the head and shank of a tack or rivet of the above type, and thereafter producing from said blank, by subsequent pressing and perforating operations, a tack or rivet having a hollow closed ended shank in which a portion of the shank wall is weakened by perforating or slitting the same sufficiently to insure that the shank end portion of the rivet or tack will readily collapse before the head during the riveting operation when installing the fastener, and thus the upset shank will spread evenly in all directions to form a second head; and the following is a more detailed description of the present embodiment of this invention, illustrating the preferred means by which these advantageous results may be accomplished:

With reference to the drawing, wherein for the purpose of illustration, is shown one specific method of carrying out the present invention and an attaching member made thereby, the numeral 15 designates a piece of sheet metal which forms a blank from which is fashioned one variety of rivet or tack, as shown in Figs. 8 and 8A, having a head 16 and a hollow shank 17 which is formed with a closed sharp-pointed conical end 18. Formed in the shank 17 are a plurality of closed elongated shaped perforations or slits 20 which are preferably symmetrically disposed in the intermediate side portion of said shank and extend lengthwise therealong, and the end extremities thereof nearest to the pointed end of the tack terminate at a point well removed from the apex of the free end or point.

As illustrated in Figs. 1 to 8A inclusive, the present improved method of making an attaching member consists in initially providing a sheet metal blank 15 in the form of a flat disk the area of which is such as will provide the requisite continuous surface for making the head 16 and the walls of the shank 17 of the improved tack when pressed therefrom by a future operation, as will be hereinafter described.

In order to provide for an easy collapse of the rivet or tack under compression at the end during installation, besides providing for a uniformly balanced distribution and flow of the material of the blank 15 constituting the shank during the extrusion and lateral compression thereof under the forming and drawing pressure, the important feature of the invention consists in perforating the shank of the rivet or tack at spaced portions thereof, as by a punching, piercing, slitting or boring operation, to provide the stock of the shank with at least two slits or holes 20, 20, which may be symmetrically disposed with respect to the blank, as shown. The slits 20 may be formed in the rivet either by slitting or perforating the flat disk 15 before shaping the shank portion therefrom or by initially pressing the shank from the flat blank 15 and then slitting the shaped shank, and it is further feasible to form the slits in accordance with either of the above methods with or without cutting away and removing any of the stock in the shank. Moreover, in the manufacture of the sharp-pointed tack shown in Fig. 8A, the slits 20 in the shank are made of sufficient size as to provide just enough material for the formation of a smooth continuous sharp-pointed shank without any waste pieces of material remaining to form wrinkled portions.

In carrying out this improved method, the perforated blank 15 (Figs. 1 and 1A) is subjected to a series of successive pressing or drawing operations during which the blank 15 having the cut-out portions 20 is operated on in a successive manner by a series of dies between which the blank is placed and shaped into the desired form. As shown in the drawing, the blank 15 after being perforated (Figs. 1 and 1A) is pressed between a pair of dies to form the shallow, cup-shaped shank 17 (Figs. 2 and 2A) of greater diameter than its depth and having a sloping base. During subsequent pressing operations by passage between a pair of opposed dies the shank portion 17 of the blank is drawn out to the desired shape while being progressively reduced in diameter (Figs. 3 to 6A inclusive) in the course of which the head 16 is initially formed (Figs. 3 and 3A), and the pointed end 18 provided by compressing the attenuated shank for a portion of its length to taper it into a sharp point while laterally squeezing the material of the shank to close the perforations 20 (Figs. 7, 7A, 8 and 8A).

In Figs. 9 to 12 inclusive, are shown one feasible manner of installing an attaching member made in accordance with the present invention, and consists of a tack 25 formed from a single piece of sheet metal in the above manner, as thus described, having a sharp self-piercing pointed end which is capable of puncturing and passing through a carrying member 26 to extend through the apertured bottom 27 of the cup-shaped part 28 of a snap fastener which it is desired to attach to the member 26. The short upright portion of the shank of the tack 25 extending above the top face of the bottom 27 of the part 28 (Fig. 10) and including the pointed end of the tack, is then upset in any suitable manner, as by a pressing, peening or riveting operation, so as to mushroom and spread the metal and form a head 29 which will firmly hold the part 28 of the snap fastener in place on the carrying member.

By reason of the plurality of symmetrically oppositely disposed perforations 20 in the body of the shank of the tack, a more even spreading of the end portion and point thereof is obtained in which there will be an increased and uniform distribution of the material thereof overlying the bottom element of the part 28.

In Fig. 13 there is shown a modified form of rivet embodying the present invention and consists of a head 30 and a shank 31 having a plain closed end 32, and the side wall of the shank is slitted as at 33 to provide spaced symmetrically disposed elongated openings extending longitudinally in the shank which serve to weaken the shank and permit a uniform spreading of the end in all directions when the latter is upset and, in addition, results in an even collapsing thereof to produce an even mushroom effect as the end is being headed by beating or pressing the same during the riveting operation.

The foregoing description is directed solely towards the construction illustrated, but it is desired that it is to be understood that the privilege is reserved of resorting to all the mechanical changes to which the device is susceptible, the invention being defined and limited only by the terms of the appended claims.

We claim:

1. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, and thereafter shaping and perforating the blank to obtain an integral rivet body having a head and shank in which the latter portion thereof is provided with a plurality of spaced slits to produce sufficient weakening of the shank as to insure that the same will readily collapse before the head during the upsetting and riveting operation so as to spread evenly in all directions while being headed.

2. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, perforating the shank portion of the blank to provide a plurality of spaced slits therein, and thereafter forming from said blank a hollow-closed-ended shank from the perforated stock thereof with a head integral therewith.

3. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, and thereafter forming a hollow elongated closed-ended shank from said blank, and subsequently providing the shank with a plurality of spaced slits.

4. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, then pressing a hollow closed-ended shank from said blank, and thereafter cutting a plurality of spaced slits in said shank.

5. The method of making an attaching member of the class described in the form of a tack having a head and a sharp-pointed hollow shank integral therewith comprising the steps of providing a single piece of sheet metal of a proper shape and having sufficient surface to constitute a blank from which can be pressed as a unitary body the head and shank portions of a tack, perforating the material of said blank from which is to be formed the shank of the tack, and thereafter forming a hollow sharp-pointed shank from the portion of said blank which includes the perforated area.

6. The method of making an attaching member of the class described in the form of a tack having a head and a sharp-pointed hollow shank integral therewith comprising the steps of providing a single piece of sheet metal of a proper shape and having sufficient surface to constitute a blank from which can be pressed as a unitary body the head and shank portions of a tack, perforating the material of said blank from which is to be formed the shank of the tack, and thereafter pressing a hollow sharp-pointed shank from the portion of said blank which includes the perforated area.

7. The method of making an attaching member of the class described in the form of a tack having a head and a sharp-pointed hollow shank integral therewith comprising the steps of providing a single piece of sheet metal of a proper shape and having sufficient surface to constitute a blank from which can be pressed as a unitary body the head and shank portions of a tack, perforating the material of the central portion of said blank from which is to be formed the shank of the tack, and thereafter forming a hollow sharp-pointed shank from the portion of said blank which includes the perforated area.

8. The method of making an attaching member of the class described in the form of a tack having a head and a sharp-pointed hollow shank integral therewith comprising the steps of providing a single piece of sheet metal of a proper shape and having sufficient surface to constitute a blank from which can be pressed as a unitary body the head and shank portions of a tack, perforating the material of said blank from which is to be formed the shank of the tack to form at least two holes therein, and thereafter forming a hollow sharp-pointed shank from the portion of said blank which includes the perforated area.

9. The method of making an attaching member of the class described in the form of a tack having a head and a sharp-pointed hollow shank integral therewith comprising the steps of providing a single piece of sheet metal of a proper shape and having sufficient surface to constitute a blank from which can be pressed as a unitary body the head and shank portions of a tack, perforating the material of said blank from which is to be formed the shank of the tack to form at least two holes therein which are disposed intermediate of the shank and terminate at a point well removed from said end point when closed, and thereafter forming a hollow sharp-pointed shank from the portion of said blank which includes the perforated area, and closing said perforations by reducing the material of the shank adjacent thereto to provide a sharp point.

10. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, and thereafter forming a hollow elongated closed-ended shank from said blank, and subsequently piercing the wall of the the shank at a plurality of circumferentially spaced portions to provide a plurality of elongated openings therein.

11. The method of making an attaching member of the class described in the form of a rivet fashioned from a single piece of sheet metal and having a head and a hollow closed-ended shank integral therewith which comprises providing a single piece of sheet metal shaped to provide a blank having sufficient surface for the formation therefrom in a continuous unitary body the head and shank of a rivet, perforating the shank portion of the blank in a longitudinal direction at a plurality of spaced positions to provide therein several oppositely disposed slits, and thereafter expanding the perforated shank portion of said blank by pressure to cause it to be elongated in a generally longitudinal direction relative to the axis of the shank portion to form a hollow thin walled closed ended shank provided with longitudinally extending slits therein and having an enlarged head integral therewith.

JAMES H. ARTHUR.
FRANK E. CHACE.